(12) United States Patent
Munsell et al.

(10) Patent No.: US 9,564,988 B2
(45) Date of Patent: Feb. 7, 2017

(54) METHOD AND SYSTEM FOR FORMING A FORMATTED CONTENT STREAM AND USING A CYCLIC REDUNDANCY CHECK

(75) Inventors: Michael R. Munsell, Playa del Rey, CA (US); James A. Michener, Grass Valley, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1788 days.

(21) Appl. No.: 11/828,605

(22) Filed: Jul. 26, 2007

(65) Prior Publication Data

US 2009/0031189 A1    Jan. 29, 2009

(51) Int. Cl.
*H04L 1/00*         (2006.01)
*H04L 29/06*        (2006.01)

(52) U.S. Cl.
CPC ........... *H04L 1/0041* (2013.01); *H04L 1/0061* (2013.01); *H04L 63/0428* (2013.01); *H04L 63/12* (2013.01)

(58) Field of Classification Search
CPC .............................. H04L 1/0041; H04L 1/0061
USPC ......................................... 714/708, 776, 758
See application file for complete search history.

(56) References Cited

U.S. PATENT DOCUMENTS

| | | | | |
|---|---|---|---|---|
| 3,866,175 A | * | 2/1975 | Seifert et al. | 340/825.52 |
| 4,575,847 A | * | 3/1986 | Fallwell et al. | 714/812 |
| 4,680,764 A | * | 7/1987 | Suzuki et al. | 714/756 |
| 4,788,685 A | * | 11/1988 | Sako et al. | 714/756 |
| 4,908,828 A | * | 3/1990 | Tikalsky | H04L 1/0083 370/389 |
| 4,970,714 A | * | 11/1990 | Chen et al. | 370/216 |
| 5,200,864 A | * | 4/1993 | Dunn | G06F 3/0601 360/20 |
| 5,274,772 A | * | 12/1993 | Dunn | G06F 3/0601 360/48 |
| 5,335,328 A | * | 8/1994 | Dunn | G06F 3/0607 360/48 |
| 5,410,344 A | * | 4/1995 | Graves et al. | 725/46 |
| 5,497,371 A | * | 3/1996 | Ellis et al. | 370/412 |
| 5,617,541 A | * | 4/1997 | Albanese | H04L 29/06 380/42 |
| 5,668,810 A | * | 9/1997 | Cannella, Jr. | 370/392 |
| 5,708,662 A | * | 1/1998 | Takashima | H04H 20/59 370/496 |
| 5,752,176 A | * | 5/1998 | Kimura | H04B 1/1646 375/376 |
| 5,784,527 A | * | 7/1998 | Ort | 386/220 |

(Continued)

OTHER PUBLICATIONS

Non-final Office action dated Nov. 30, 2010 in U.S. Appl. No. 11/828,530, filed Jul. 26, 2007 by Diem V. Nguyen et al.

(Continued)

*Primary Examiner* — Joseph D Torres
(74) *Attorney, Agent, or Firm* — Harness, Dickey & Pierce, PLC

(57) ABSTRACT

A communication system includes a content repository storing a content file and a video transport processing system receiving the content file and dividing the content file into a plurality of content file portions, forming a leading data portion, determining a cyclic redundancy check value, forming a trailing data portion with the cyclic redundancy check value therein, forming a content data stream from the leading data portion, the plurality of content file portions and trailing data portion. The system also includes a system communicating the content data stream to a user device.

20 Claims, 9 Drawing Sheets

(56) References Cited

U.S. PATENT DOCUMENTS

| | | | | |
|---|---|---|---|---|
| 5,790,523 | A * | 8/1998 | Ritchie, Jr. | H04H 20/12 348/E7.049 |
| 5,854,840 | A * | 12/1998 | Cannella, Jr. | 380/268 |
| 5,875,007 | A * | 2/1999 | Zhung et al. | 375/240.28 |
| 5,909,434 | A * | 6/1999 | Odenwalder et al. | 370/342 |
| 5,930,706 | A * | 7/1999 | Raith | 455/422.1 |
| 5,987,023 | A * | 11/1999 | Albrow et al. | 370/350 |
| 6,041,051 | A * | 3/2000 | Doshi et al. | 370/352 |
| 6,044,086 | A * | 3/2000 | Albrow et al. | 370/458 |
| 6,092,231 | A * | 7/2000 | Sze | 714/758 |
| 6,201,798 | B1 | 3/2001 | Campanella et al. | 370/326 |
| 6,212,176 | B1 * | 4/2001 | Andersson et al. | 370/347 |
| 6,320,843 | B1 * | 11/2001 | Rydbeck et al. | 370/207 |
| 6,324,395 | B1 * | 11/2001 | Khayrallah et al. | 455/406 |
| 6,324,667 | B1 * | 11/2001 | Sugaya | 714/746 |
| 6,332,006 | B1 * | 12/2001 | Rydbeck et al. | 375/262 |
| 6,337,861 | B1 * | 1/2002 | Rosen | 370/389 |
| 6,359,877 | B1 * | 3/2002 | Rathonyi | H04L 1/0002 370/232 |
| 6,367,047 | B1 * | 4/2002 | McAuliffe | G11B 20/1833 714/755 |
| 6,381,706 | B1 * | 4/2002 | Zaczek | G11B 20/1833 360/53 |
| 6,405,039 | B1 * | 6/2002 | Koorapaty et al. | 455/434 |
| 6,421,805 | B1 * | 7/2002 | McAuliffe | G06F 11/10 714/756 |
| 6,498,936 | B1 * | 12/2002 | Raith | 455/466 |
| 6,557,171 | B1 | 4/2003 | Sonoda et al. | |
| 6,584,083 | B1 | 6/2003 | Toporek et al. | |
| 6,631,124 | B1 * | 10/2003 | Koorapaty et al. | 370/337 |
| 6,697,433 | B1 * | 2/2004 | Asai | H04N 19/89 375/240.27 |
| 6,757,264 | B1 * | 6/2004 | Gayrard | 370/316 |
| 6,760,311 | B1 * | 7/2004 | Raith | 370/252 |
| 6,768,728 | B1 * | 7/2004 | Kim et al. | 370/342 |
| 6,791,985 | B1 * | 9/2004 | Ashwood-Smith et al. | 370/395.5 |
| 6,804,257 | B1 * | 10/2004 | Benayoun et al. | 370/471 |
| 6,928,289 | B1 * | 8/2005 | Cho et al. | 455/452.2 |
| 6,975,646 | B2 * | 12/2005 | Yamashita | 370/466 |
| 7,058,071 | B1 * | 6/2006 | Myles | H04W 28/14 370/419 |
| 7,197,088 | B1 | 3/2007 | Yukawa | |
| 7,231,530 | B1 * | 6/2007 | Miller et al. | 713/320 |
| 7,280,562 | B2 * | 10/2007 | Sindhushayana et al. | 370/474 |
| 7,394,779 | B2 | 7/2008 | Seo et al. | |
| 7,489,688 | B2 * | 2/2009 | Giesberts et al. | 370/392 |
| 7,496,092 | B2 | 2/2009 | Wilson | |
| 7,577,438 | B2 * | 8/2009 | Sammour et al. | 455/450 |
| 7,590,118 | B2 * | 9/2009 | Giesberts et al. | 370/392 |
| 7,646,768 | B2 | 1/2010 | Coupe et al. | |
| 7,676,735 | B2 * | 3/2010 | Luby | H03M 13/1515 714/755 |
| 7,706,408 | B2 * | 4/2010 | Takagi et al. | 370/473 |
| 7,716,559 | B2 * | 5/2010 | Champel | H04L 1/0041 714/776 |
| 7,720,088 | B2 * | 5/2010 | Wu | 370/442 |
| RE41,497 | E * | 8/2010 | Sugaya | 714/746 |
| 7,860,018 | B2 * | 12/2010 | Raith | 370/252 |
| 7,873,072 | B2 | 1/2011 | Kim et al. | |
| 8,908,716 | B2 * | 12/2014 | Denney | H04W 28/14 370/468 |
| 2002/0064189 | A1 | 5/2002 | Coupe et al. | |
| 2002/0067745 | A1 | 6/2002 | Coupe et al. | |
| 2002/0184649 | A1 | 12/2002 | Wilson | |
| 2003/0063607 | A1 | 4/2003 | Adachi et al. | |
| 2004/0120349 | A1 | 6/2004 | Border et al. | |
| 2005/0013262 | A1 | 1/2005 | Zein Al-Abedeen et al. | |
| 2005/0265547 | A1 | 12/2005 | Strasser et al. | |
| 2006/0153104 | A1 | 7/2006 | Lee et al. | |
| 2006/0209709 | A1 | 9/2006 | Kovacevic | |
| 2006/0291803 | A1 | 12/2006 | Watson et al. | |
| 2008/0137847 | A1 | 6/2008 | Candelore et al. | |
| 2008/0226073 | A1 | 9/2008 | Hawkes et al. | |
| 2010/0189254 | A1 | 7/2010 | Candelore et al. | |

OTHER PUBLICATIONS

Non-final Office action dated Jun. 21, 2010 in U.S. Appl. No. 11/828,530, filed Jul. 26, 2007 by Diem V. Nguyen et al.
Final Rejection dated May 11, 2011 in U.S. Appl. No. 11/828,530, filed Jul. 26, 2007 by Diem V. Ngugen et al.

* cited by examiner

US 9,564,988 B2

METHOD AND SYSTEM FOR FORMING A FORMATTED CONTENT STREAM AND USING A CYCLIC REDUNDANCY CHECK

TECHNICAL FIELD

The present disclosure relates to a content processing and delivery system and, more specifically, to formatting a content file with specific data portion for transmission through a communication network or satellite and using a cyclic redundancy check.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

SUMMARY

The present disclosure allows content files to use a cyclic redundancy check to increase the accuracy of the system.

In one aspect of the disclosure, a method includes dividing a content file into a plurality of content file portions, forming a leading data portion, determining a cyclic redundancy check value, forming a trailing data portion with the cyclic redundancy check value therein, forming a content data stream from the leading data portion, the plurality of content file portions and trailing data portion and communicating the content data stream to a user device.

In a further aspect of the disclosure, a communication system includes a content repository storing a content file and a video transport processing system receiving the content file and dividing the content file into a plurality of content file portions, forming a leading data portion, determining a cyclic redundancy check value, forming a trailing data portion with the cyclic redundancy check value therein, forming a content data stream from the leading data portion, the plurality of content file portions and trailing data portion. The system also includes a system communicating the content data stream to a user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
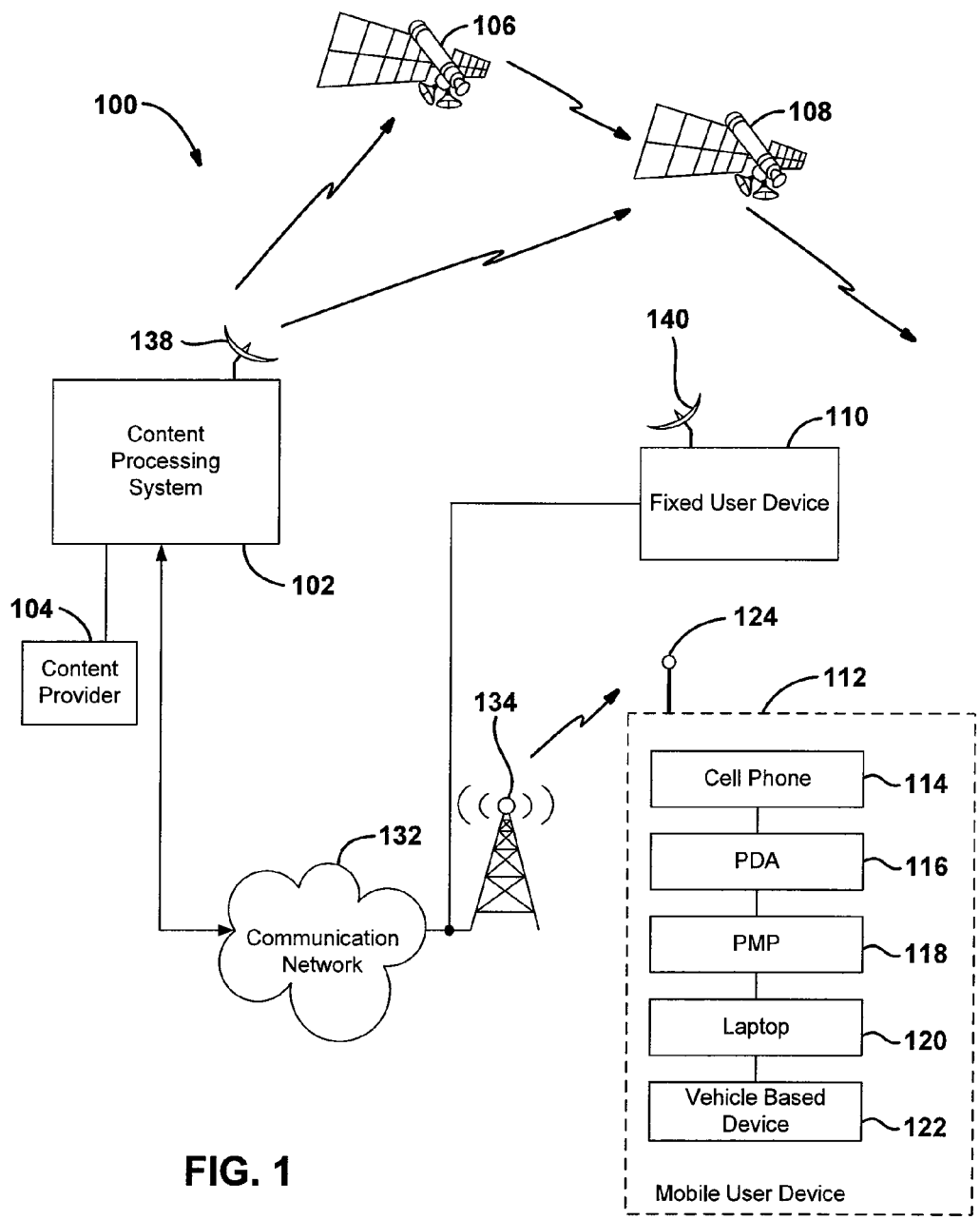
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
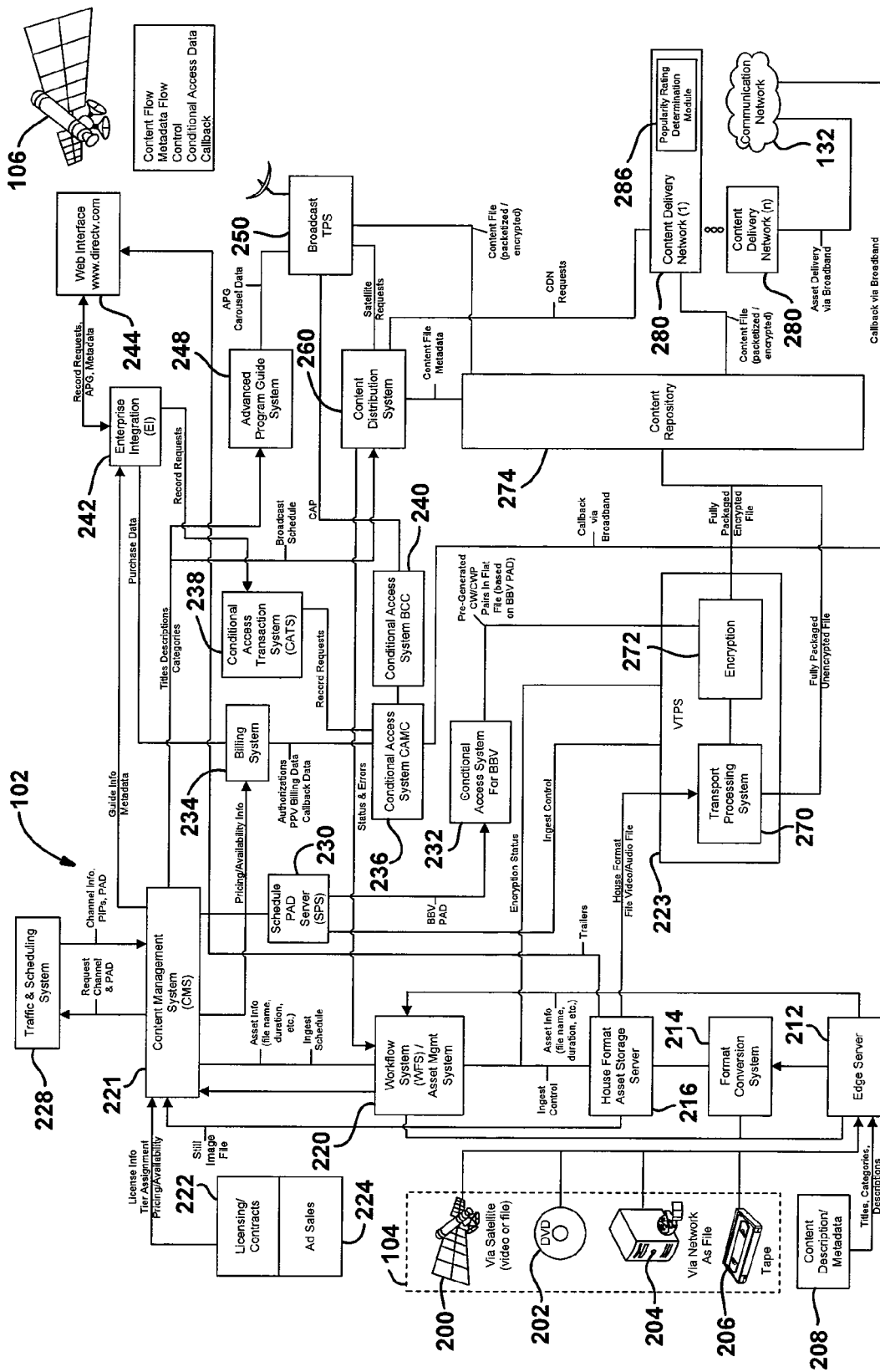
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide a content description and other metadata 208 to the system. An input server 212 may receive the various content and associated metadata and convert the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Content files may also be provided from the content management system 221 to the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD 110 and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

The content delivery network 280 may also be used to count the number of times a particular content has been requested for download. A popularity rating determination module 286 may be included in the content delivery network 280. The popularity determination module 286 ultimately provides a popularity rating to the content management system 221. Of course, the popularity rating determination module 286 may generate a count and the content management system may generate a count of the number of downloads and provide that to the content management system 221. Each content delivery network 280 may provide the popularity rating or count to the content management system 221. The content management system 221 may combine the counts from several control delivery networks 280.

The content management system 221, in response to the information from the popularity rating determination module 286, may be used to assign a satellite category or a broadband category to each of the plurality of content files. The popularity rating may also be used to allocate assets of the satellite to the distribution of content through the satellite 106. The asset allocation of the satellite may depend upon various conditions. The satellite includes a particular bandwidth or "pipe" that is used for uplinking of material or content. Some of the bandwidth of the satellite is typically used for live broadcast. Another portion of the satellite may be used for broadband satellite distribution. The portion of the satellite broadband distribution asset may be referred to as the pipe or the broadband pipe which indicates it is other than the live or real time content. The overall pipe may be divided into several pipes or subpipes and used for various numbers of content. From the list of the content corresponding to popularity ratings, several of the broadband content files may be distributed at any particular time. If one item of the broadband content is very popular, more resources may be allocated to that particular content. The bigger the pipe associated with the content, the less time it takes a user to download the content. However, less bandwidth will be available to other types of content. Therefore, the allocation of the pipe may be based upon several things, including the size of a content file, the popularity rating, the number of pipes and the pipe size. System requirements may cause the pipe size pipe number to vary over time. For example, the schedule of broadband content to be downloaded may be changed periodically. The broadband content schedule may be changed once a day or several times a day.

It is beneficial to provide popular content over the satellite to reduce the burden of the broadband terrestrial-based communication network. Terrestrial-based communication may be more expensive in certain situations. Therefore, popular items may be broadcast through the satellite while less popular content may be broadcast through the communication network 132. Thus, based upon the popularity, the satellite or the communication network 132 may be chosen. Thereafter, the satellite assets may also be allocated based upon the popularity of various content.

Figure 3:
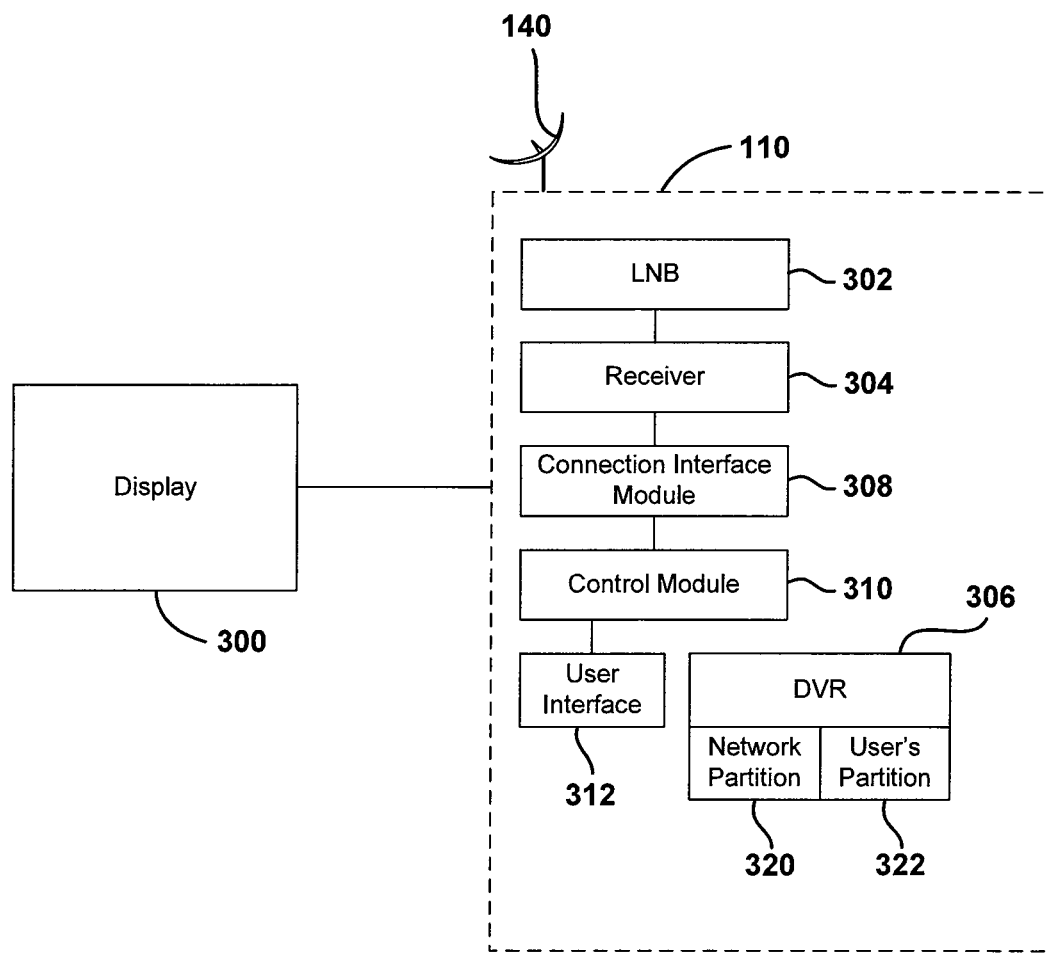
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a recorder 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of storage devices such as a hard disk drive, DVR, or other types of memory devices. The memory device 306 may be used to store the packetized assets and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4A:
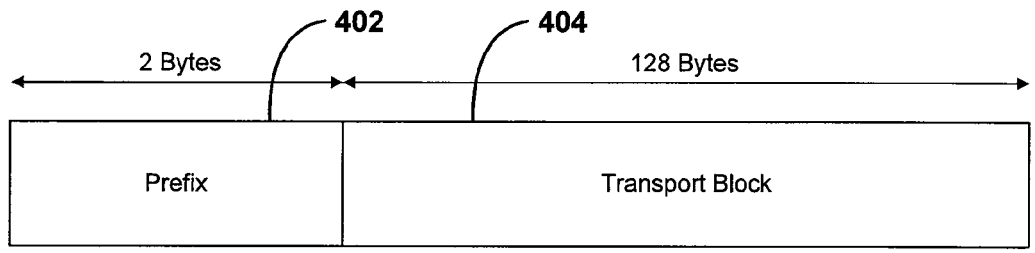
FIGS. 4A, 4B and 4C are representational views of packets formed according to the present disclosure.

Referring now to FIG. 4A, a packet 400 is illustrated having a prefix or header portion 402 and a data transport block 404. As illustrated, the prefix portion is two bytes and the transport block is 128 bytes. Of course, various sizes of prefixes in transport blocks may be used depending on the particular system needs. The packet 400 may also represent a data field as will be described below. The transport layer is used for providing robust video delivery over a satellite channel or through a communication network. The packet length may be fixed to provide error detection, logical resynchronization, and error concealment at a receiving device. As will be described further below, the transport protocol may include two distinct sublayers: a data-link/network sublayer and an adaption sublayer. The data link/network sublayer provides generic transport services such as scrambling control flags, a synchronous cell multiplexing, and error control. The adaptation layers designed for efficient packeting of variable length MPEG data into fixed length cells while providing rapid logical resynchronization and error concealment support at a decoder when uncorrectable error events take place.

Figure 4B:
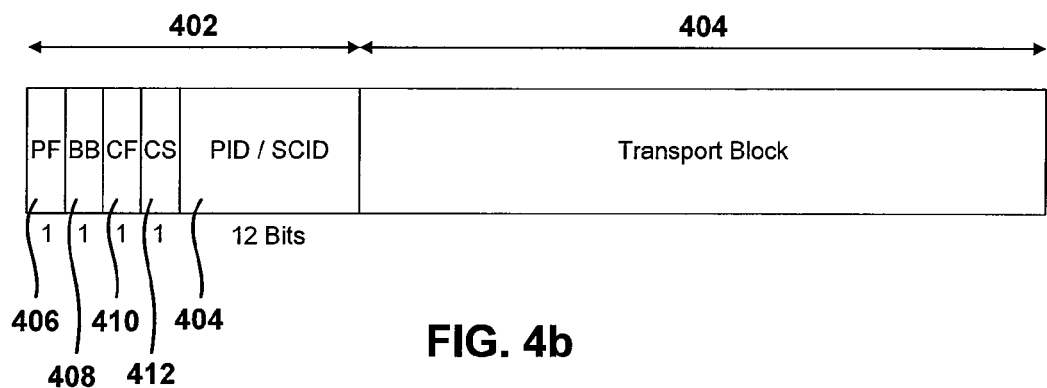

Referring now to FIG. 4B, the prefix or header 402 is illustrated in further detail. In this example, if a prefix includes four bits of control information and 12 bits for an identification such as a program identification or service channel identification. The service multiplexing capabilities may support various types of video, audio and data services. In one embodiment, only the transport block 404 is encrypted, while the prefix or header 402 is not encrypted.

The prefix 402 includes a packet framing bit 406 that toggles between zero and one with each packet. A bundled boundary bit 408 may also be included in the prefix 402. The bundled boundary bit 408 may communicate different information depending on the type of video service. For example, standard definition video may include a bundled boundary bit of "1" when non-auxiliary video data is present in the transport block 404. For high definition, a 1 may indicate that a packetized elementary stream (PES) may be included in the transport stream but not necessarily as the first byte. A value of zero that does not include a packetized elementary stream (PES) does not have a PES start code.

The prefix 402 may also include a control flag bit 410 to indicate that the transport block may be scrambled or not scrambled.

The prefix 402 may also include a control sync bit 412 that indicates a key use for descrambling. If an auxiliary packet payload contains a control word packet (CWP), this bit indicates which CWP-derived scrambling key may be used to descramble the service packets with the same control sync as that of the auxiliary packet. For example, the key obtained from an auxiliary packet with CS=0 is used for descrambling transport packets with CS=0.

The PID/SCID block 414 may be used to uniquely identify the application for which the information in the transport packet's block it is intended. Some PID/SCID numbers may be reserved for specific purposes. For example, 0x000 may signify a null packet and other combinations may represent other important information if required by the system.

Figure 4C:
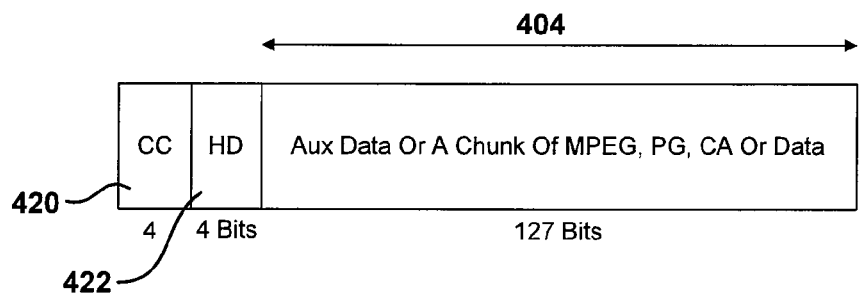

Referring now to FIG. 4C, the transport block 404 is illustrated in further detail. The transport block may include auxiliary data packets or video service packets containing formatted video data such as MPEG data. To indicate different cell types, the video transport layer format may include four bits for a continuity counter 420 and a header designator 422. The continuity counter 420 allows a receiver to detect cell discontinuity due to cell errors for a particular transport service. In one example, a packet on a particular service channel identifier may be incremented by one in each packet. After the continuity counter 420 reaches a maximum value of 15, the continuity counter 420 may wrap to 0000b. When the header designator 422 contains 0000b, auxiliary data may be indicated which allows the continuity checker to spend incrementation and resume after an auxiliary data packet is not present. The header designator may be in the format 1X0b to indicate that a video service packet is provided. As mentioned above, an auxiliary data packet may include 0000b as a header designator for auxiliary packets.

Figure 5:
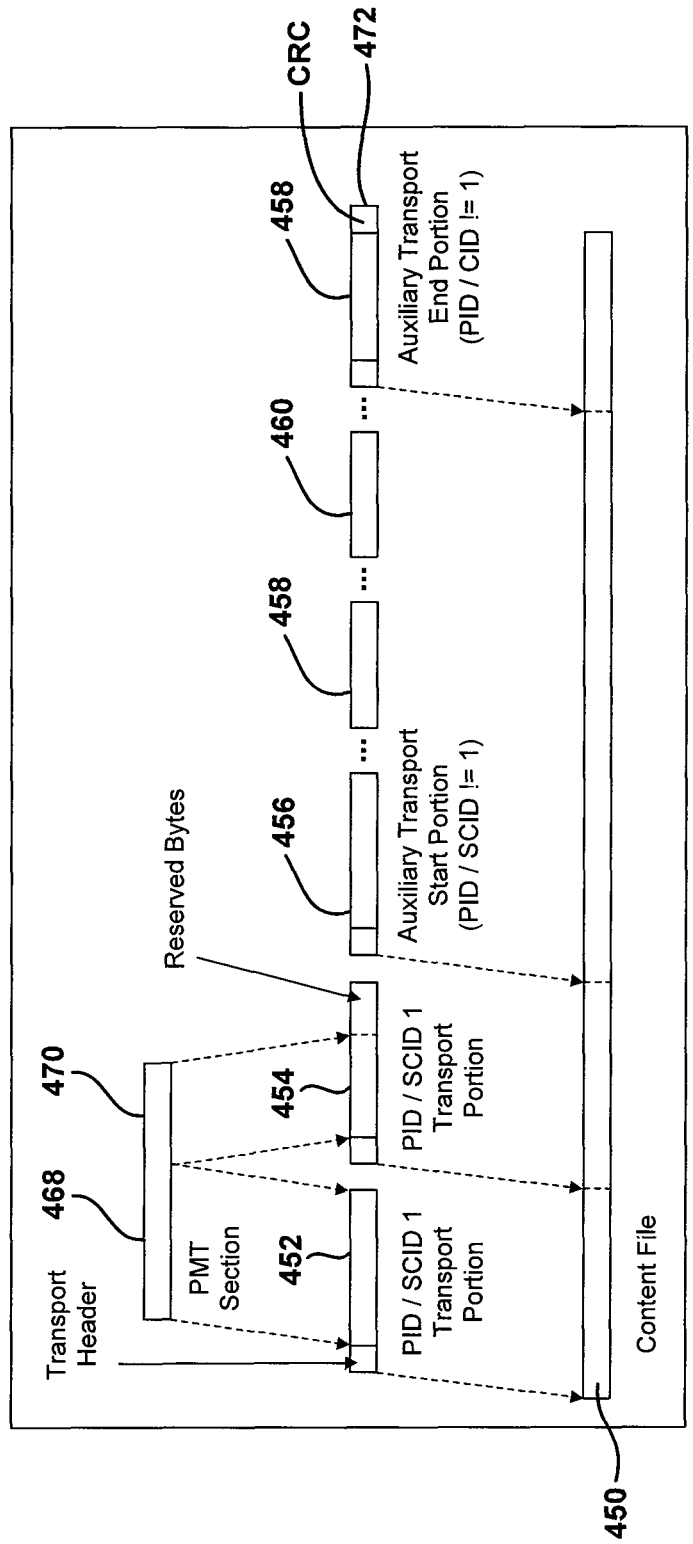
FIG. 5 is a diagrammatic representation of a content file and various portions within the content file.

Referring now to FIG. 5, a representation of a content file 450 that is ultimately communicated as a content stream is indicated. The content file may have various portions illustrated by the two layers above the content file. The content file may be converted by the VTPS 223 into a plurality of transport portions 452, 454, 456, 458, 460, and 462.

The transport portions 452 and 454 may include a program map table (PMT) in the transport block that is indicated by reference numerals 468 and 470. The program mapped table may define all the PIDs utilized in the content file. A PID or SCID of one may indicate the packet or portion is a program mapped table. As illustrated in FIG. 5, the first two transport portions include the program map table. The PMT may be removed when communicating the content file or stream through a satellite but retained when communicating over a terrestrial communication system such as a broadband network.

The other portions of the content file may include an auxiliary start portion at 456 and auxiliary end portion at 462. The contents of the auxiliary data files will be described below. It should be noted that the auxiliary end portion file may include a cyclic redundancy check (CRC) 472.

Several other content packets may be included such as packets 458 and 460. Packets 458 and 460 merely represent two of several packets that a content file may be divided into.

Figure 6:
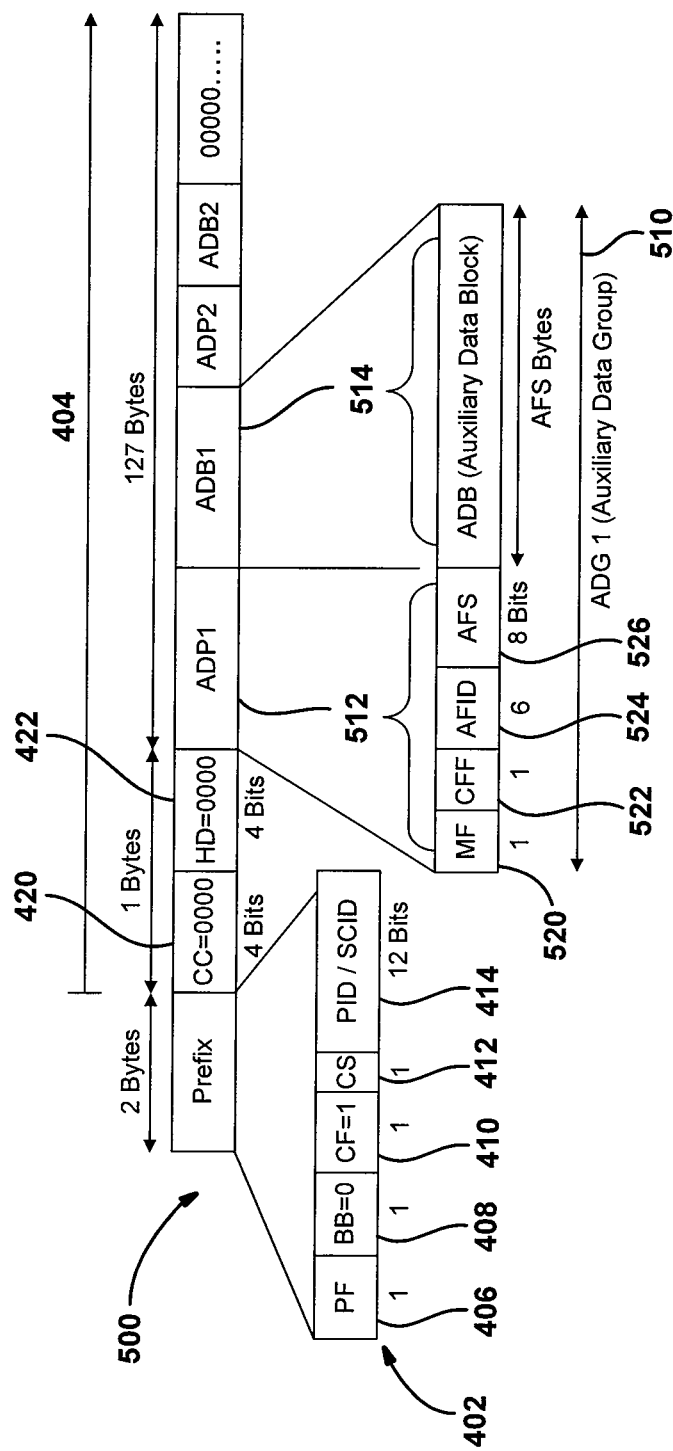
FIG. 6 is a diagrammatic representation of an auxiliary data packet structure that may be used for the content file of FIG. 5.

Referring now to FIG. 6, an auxiliary data packet structure 500 is illustrated. The packet 500 may include a prefix portion 402 similar to that described above and correspondingly labeled. The prefix portion may include the packet framing portion 406, the bundled boundary portion 408, the control flag portion 410, the control sync portion 412, and the PID/SCID portion 414. The transport portion 404 may include 128 bytes as described above in FIGS. 4A-4C. The transport portion may include the continuity counter 420 and the header designator 422. As mentioned above, an auxiliary portion may include the continuity counter value of 0000b. The header designator may include the value 0000b.

The auxiliary data structure may include an auxiliary data group 510. The auxiliary data group may contain reference time stamps, encryption control word packets (CWPs), time code and group of picture (GOP) map data, broadband video data, and secure video processor control data packets. Reference time stamps may be used to synchronize the encoder with the decoder in a receiver. The encryption control word packet contains keys with which scrambled application packets are descrambled. The packets may be transmitted without scrambling as indicated by CF=1. If a control word packet (CWP) is contained in the auxiliary data group 510, the control sync within the same packet will indicate which key is contained in the auxiliary data group. The receiver may use the control sync that is transmitted in the application packet to determine which key shall be used to decrypt the transport block. A complete key is 64 bits long but may be hidden inside the 120 byte control word packet. The conditional access smart card in the user device may extract a key from the control word packet and send it to a decoder which uses the key to descramble the transport packet. Auxiliary data packets 514 containing control word packets are transmitted redundantly but change at a transition to a new scrambling key. As indicated by a toggle of the CS bit in the prefix 402. Time code data and SVP control data may not be in the first auxiliary packet transmitted in a new key period. The CS bit for the non-CWP packets may reflect the key sense for the key period in which they are contained. The auxiliary data group 510 may include an auxiliary data prefix 512 having two bytes and an auxiliary data block 514 that may be variable in length. An auxiliary packet may contain one or more auxiliary data groups placed next to each other. Should the payload not be completely filled with auxiliary data group data, the remaining bytes may be filled with zeros. The auxiliary data prefix may include several bits of information, including a modifiable flag 520. In one constructed embodiment, this bit was always set to one. However, this flag may be reserved for subsequent use. In block 522, a current field flag (CFF) may indicate whether a valid auxiliary data group is present. For example, if this bit is one, the auxiliary data group may contain valid data. If the bit is set to zero, the remainder of the packets starting immediately after the current field flag may be ignored.

The auxiliary data prefix 512 may also include an auxiliary field identification (AFID) 524. The AFID 524 may be used to identify the auxiliary data group. Reference time stamp and control word packet auxiliary data groups may co-exist in the same auxiliary data packet with control word only packets. The combination of bits may indicate deprecated, encryption control word packet only, reference time stamp and control word packet information, time code/GOP map data, SVP control data, broadband video data, and the like.

The auxiliary data prefix 512 may also include an auxiliary field size (AFS) block 526 that contains the length of the following auxiliary data block in bytes.

In the case of an encryption control word packet only, the AFID bit may be set to 00001, the AFS 526 may be set to 120, and the control word packet may include various information for managing encryption and conditional access. For a reference time stamp, and control word packet, the AFID may be 000011 and the AFS may be at 125. The auxiliary data block may include a byte of all zeros followed by 32 bits that represent a sample from a reference clock at the encoder. This may, for example, be taken as the time the auxiliary data packet left the encoder. The control word packet may than follow. When the AFID is 000100 and the AFS is 125, the auxiliary data block may indicate time code and GOP map packet. Various fields, including a picture-type field, may be included, such as I-picture, P-picture, and B-picture values. Time code may also be formatted in sequence such as hours, minutes, bit markers, seconds, and frames. The GOP map may indicate the GOP picture length and a bit map.

A secure video processor control data packet may include control data for secure video processor-protected content.

Should the AFID 524 and AFS 526 indicate that a broadband video packet is present, various types of information may be included in the auxiliary data block 514. The broadband video auxiliary packet conveys information about a broadband video content file. When the content file is delivered via a broadcast transport stream, the first and last packets of the content file may be broadband packets as illustrated in FIG. 5 by reference numerals 456 and 462. When a content file is delivered via other means, such as file transfer over the internet, the first non-PMT packet of the content file and the last packet of the content file may be broadband video auxiliary packets. Auxiliary data block may include various information, including a start of file indication. This field indicates whether this auxiliary packet is the first or last transport packet of the file. When set to a one, it is the first transport packet of the file, and when set to zero, it is the last transport packet of the file. A material ID link may also be included in bytes. A material ID indicates the content material ID. Each byte represents a character. There may be several reserve bytes within the auxiliary data block 514 for broadband video packets.

A cyclical redundancy check which may be a 32-bit value may also be provided. The cyclical redundancy check (CRC) may be calculated over every byte of the packet that makes up the content file, including the broadband video auxiliary packets at the start and end of the file. One suitable location for the CRC information may be the last four bytes of a content file. Therefore, the result of the CRC is over the entire content file and will be zero when the file does not contain any transmission errors. When received at a receiving device, the CRC, if not matching, may be used to generate an error signal or request a retransmission of the file to the IRD or user device. This will be further described below.

The auxiliary data packets may also be video service packets. The video may be scrambled or unscrambled. If scrambled, the CR flag may be set to zero for the indication. Video may be high definition or standard definition video.

Figure 7:
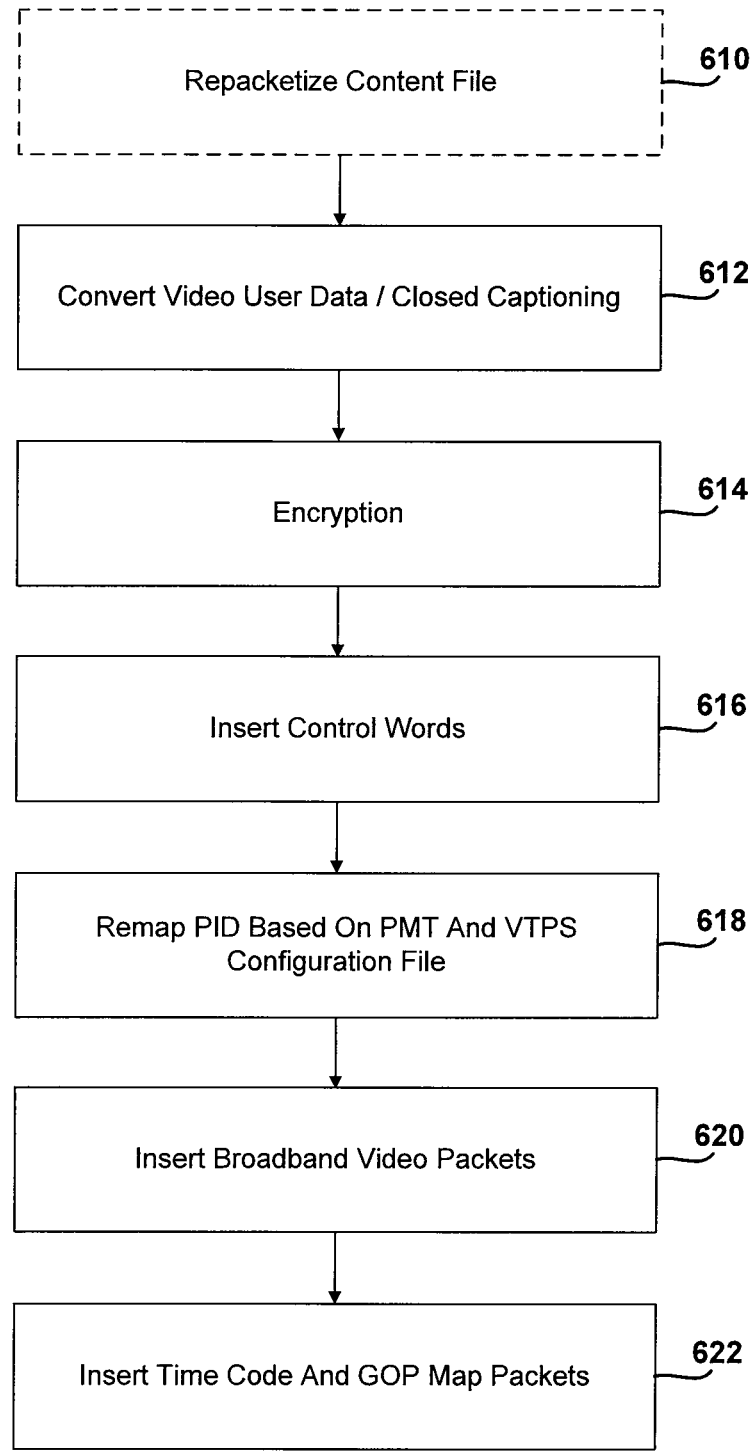
FIG. 7 is a flowchart illustrating a method for processing a content file.

Referring now to FIG. 7, a method for converting a content file into a transmittable format is illustrated. In step 610, the content file may be repacketized. The repacketization may be done optionally depending on the type of format the file is received on. If the file is in a legacy DIRECTV® format, repacketization may be performed to place the content file in a broadcast format. If the file is in a three-broadcast format, repacketization may not be required in step 610. For both an A3 mode and a legacy mode, the remaining steps are similar. In step 612, the video user data and close captioning data from a CableLab® format may be converted to a broadcast format. The cable lab format may be an Advanced Television System Committee (ATSC) format or a Society of Cable Telecommunication Engineers (SCTE) format. In step 614, encryption may be performed on the files. Encryption may take place using AES encryption or DES encryption. AES encryption may take place for three content files, whereas DES encryption may take place using legacy mode content files.

In step 616, control words may be inserted into the content stream. The control words may be inserted periodically as described in 9093-000077/US [PD-207047], the disclosure of which is incorporated by reference herein.

In step 618, the packet identification may be remapped based upon the program map table and the VTPS in a VTPS configuration file. This may be done because of formatting requirements.

In step 620, broadband video packets may be inserted. As mentioned above, the broadband video packets may be inserted after the PMT and may indicate the start and end of the content file. As mentioned above, a material ID, the start and end of a file indication, a high definition content indication, and a file cyclical redundancy check may all be used.

In step 622, time code and group of picture (GOP) map packets may also be inserted into the field. As well, digital video player access unit information may also be inserted into the content stream. By inserting time code, GOP map packets and other information, enhanced trick play of DVRs may be achieved.

Figure 8:
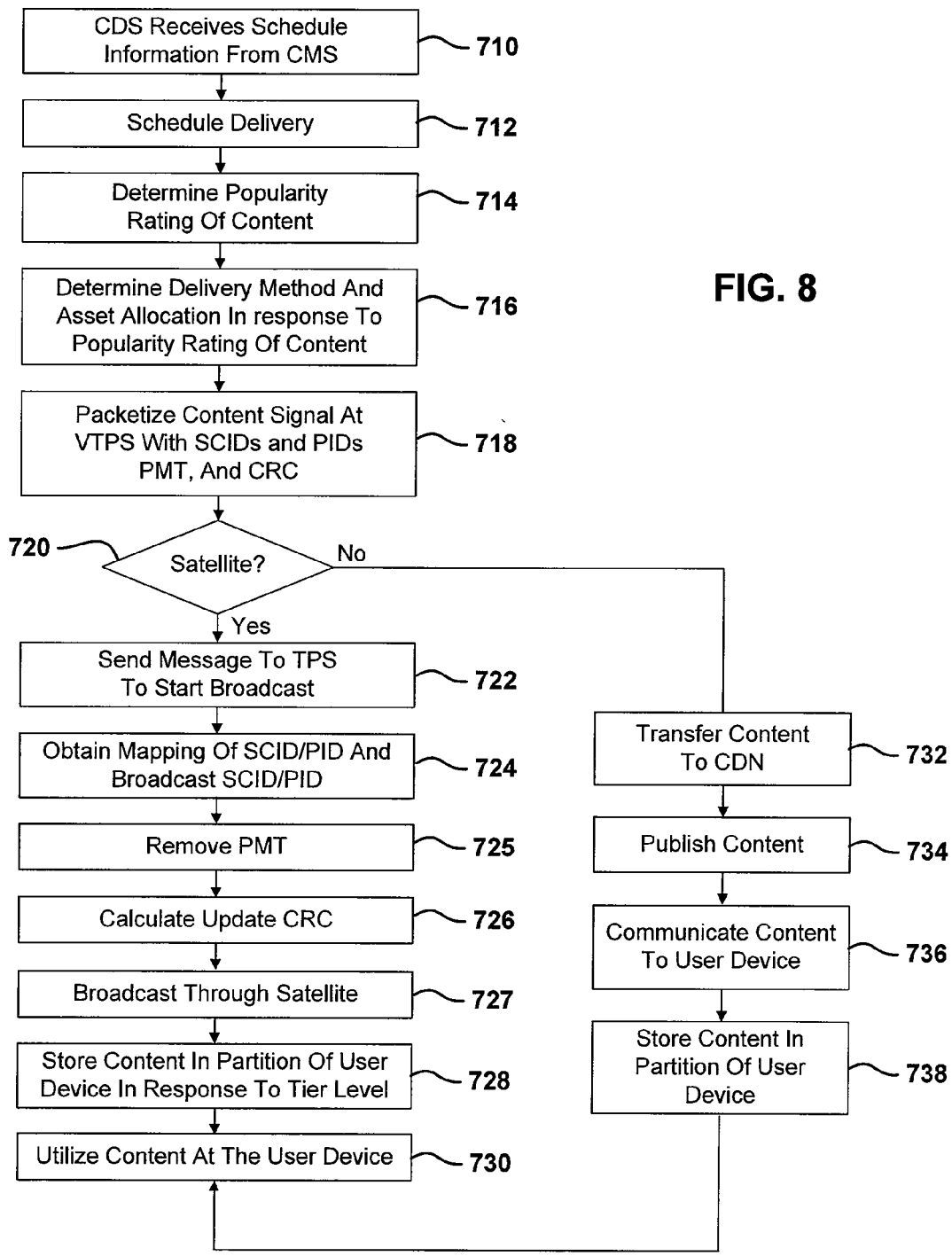
FIG. 8 is a flowchart of a method of transferring content through a satellite or a communication network according to the present disclosure.

Referring now to FIG. 8, the communication system 100 may communicate content through a satellite or through a communication network 132 such as the Internet. The method of FIG. 8 illustrates one way to determine which method may be used. In step 710, the content delivery system receives scheduled information from the content management system 220. In step 712, delivery is scheduled. In step 714, a tier level of the content is determined. The tier level of the content may be determined based upon the popularity of the content. In the following example, three different tiers are used. However, two different tiers corresponding to the satellite and to a terrestrial communication may also be used. In this example, tier one corresponds to pushing contents from the satellite to the user device. The content will be recorded on the network partition of the user device. Tier two corresponds to "opted-in" contents that are downloaded from the satellite per requests or preferences of the user device. The content is recorded on the user's partition of the customer hard drive. Tier three material or content may consist of less popular contents or niche-appeal contents that appeal to a small audience. The content may be delivered by or through the communication network 132. Contents in tier three category are recorded on the user's partition of the memory device of the user device. Some content may be communicated to the user device upon request (pulled) and some may be "pushed" to the user according to the preferences of the user. In step 716, the delivery method is determined based upon the tier level of the content. In step 718, the content is packetized at the video transport processing system with SCIDs or PIDs, PMT and CRC.

In step 720, it is determined whether or not the tier level corresponds to a satellite. In this example, tier one- and tier two-level contents correspond to the satellite distribution. If satellite distribution is determined based upon the tier level, step 722 sends a message to the transport processing system 250 of FIG. 2 to start a broadcast. In step 724, mapping may be obtained from the content management system. The mapping may be broadcast with the guide data at times other than when the content is transmitted. The content distribution system 260 obtains the mapping and changes the SCIDs or PIDs from the VTPS 223 to broadcast SCIDs or PIDs. In step 725, the program map table (PMT) is removed from the header. In step 726, a new CRC is calculated. In step 727, the content with the broadcast SCID or PIDs and the CRC are broadcast through the satellite. In step 728, content is stored in the partition of the user device in response to the tier level. That is, tier level one contents may be stored on the network partition of the user device whereas tier two contents may be stored in the user's partition of the hard drive or of the user device. In step 730, the contents are utilized at the user device.

Referring back to step 720, if the content or tier level does not correspond to a satellite, step 732 is performed. In step 732, the contents are transferred to a content delivery network. In step 734, the contents are published. In step 736, the contents are communicated to the user device through the communication network 132.

In step 738, the content is stored in the partition of the user device. In this example, the non-satellite material corresponds to tier three. Tier three content is stored in the user's partition of the memory of the user device. After step 738, step 730 is again performed in which the user device utilizes the content.

Figure 9:
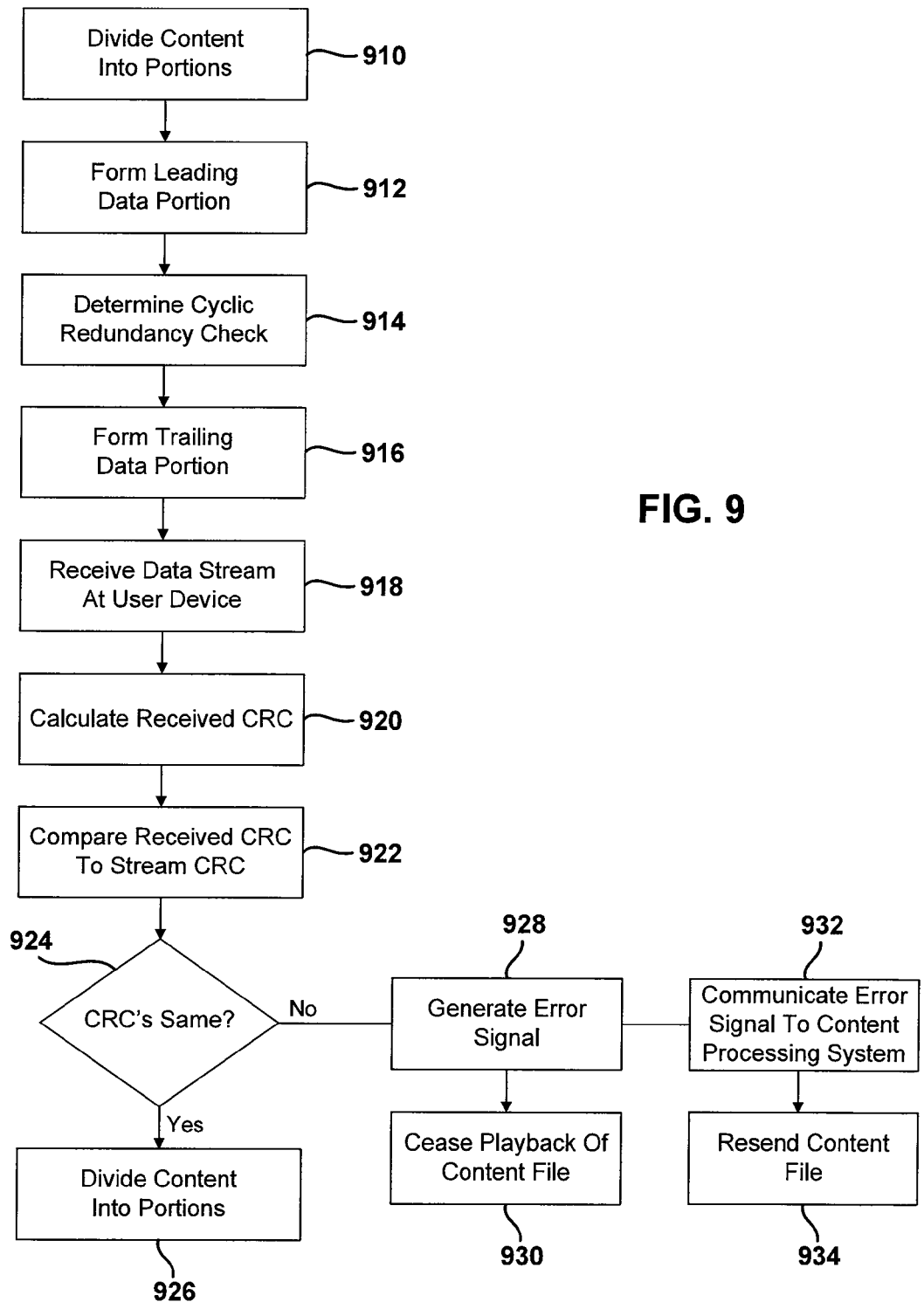
FIG. 9 is a flowchart of a method for using a cyclic redundancy check in the processing of a content file.

Referring now to FIG. 9, a method for using the cyclical redundancy check is illustrated. In step 910, the content file is divided into portions as described above in FIGS. 4-7.

In step 912, a leading data portion is formed. This is also described above. In step 914, a cyclical redundancy check is calculated. The CRC may be calculated over every byte of every packet that makes up the content file, including the broadband video auxiliary packets at the start and end of the file. In step 916, the cyclical redundancy check may be inserted into the trailing data portion of the broadband video portion. In step 918, the data stream is communicated to and received by a user device in step 918. In step 920, a received CRC may be calculated by the user device. In step 922, the received CRC is read from the content stream and the calculated CRC are compared in step 922. In step 924, if the CRCs are the same, the content file may be utilized in step 926. If the content files are not the same, an error signal may be generated in step 928. If the file is already playing back, then the playback of the file may be ceased in step 930.

Referring back to step 928, another option after an error signal is generated is to communicate the error signal to the content processing system of FIG. 1 in step 932. In step 934, the content file may be resent to the user device in step 934.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
  dividing a content file into a plurality of content file packets, each packet having a plurality of bytes therein, said content file having a material identification corresponding to a unique identifier for the content file associated therewith;
  forming a first content file portion comprising:
    forming a first leading data portion comprising the material identification;
    determining a first plurality of content file packets for the first content file portion;
    determining a first cyclic redundancy check value using each of the plurality of bytes of each of the first plurality of the first content file portion of the content file;
    forming a first trailing data portion with the first cyclic redundancy check value therein;
  forming a second content file portion comprising:
    forming a second leading data portion comprising the material identification;
    determining a second plurality of content file packets for the second content file portion;
    determining a second cyclic redundancy check value using each of the plurality of bytes of each of the second plurality of the second content file portion of the content file;
    forming a second trailing data portion with the second cyclic redundancy check value therein;
  forming a content data stream from the first leading data portion, followed by the first plurality of content file packets for the first content file portion, followed by the first trailing data portion;
  forming a content data stream from the second leading data portion, followed by the second plurality of content file packets for the second content file portion, followed by the second trailing data portion; and
  communicating the content data stream to a user device.

2. A method as recited in claim 1 wherein the content file packets comprise fields.

3. A method as recited in claim 1 further comprising receiving the data stream at a user device; and
  generating an error signal at the user device in response to the cyclic redundancy check value.

4. A method as recited in claim 3 further comprising calculating a calculated cyclic redundancy check value in response to each of the plurality of bytes of each of the plurality of the content file packets of the data stream received at the user device and wherein generating an error signal comprises generating the error signal in response to comparing the cyclic redundancy check value and the calculated cyclic redundancy check value.

5. A method as recited in claim 3 further comprising communicating the error signal to a processing system.

6. A method as recited in claim 3 further comprising communicating the error signal to a processing system though a communication network.

7. A method as recited in claim 3 further comprising disabling playback of the content file in the user device in response to the error signal.

8. A method as recited in claim 3 further comprising re-communicating the content data stream to the user device in response to the error signal.

9. A method as recited in claim 3 further comprising disabling playback of the content file in the user device in response to the error signal.

10. A method as recited in claim 1 wherein a last set of bytes within the trailing data packet comprise the cyclic redundancy check value.

11. A method as recited in claim 1 wherein prior to dividing, storing the content file in a content repository, retrieving the content file from the content repository and communicating the content file to a video transport processing system.

12. A method as recited in claim 11 wherein the steps of forming are performed in the video transport processing system.

13. A communication system comprising:
   a content repository storing a content file having a material identification;
   a video transport processing system receiving the content file and dividing the content file into a plurality of content file packets, each packet having a plurality of bytes therein, forming a first content file portion comprising forming a first leading data portion having the material identification, determining a first plurality of content file packets for the first content file portion, determining a first cyclic redundancy check value using each of the plurality of bytes of each of the first plurality of the first content file portion of the content file, forming a first trailing data portion with the first cyclic redundancy check value therein, forming a second content file portion comprising forming a second leading data portion having the material identification, determining a second plurality of content file packets for the second content file portion, determining a second cyclic redundancy check value using each of the plurality of bytes of each of the second plurality of the second content file portion of the content file, forming a second trailing data portion with the second cyclic redundancy check value therein, forming a content data stream from the first leading data portion, followed by the first plurality of content file packets, followed by the first trailing data portion; forming a content data stream from the second leading data portion, followed by the second plurality of content file packets followed by the second trailing data portion; and
   a system communicating the content data stream to a user device.

14. A system as recited in claim 13 wherein the file packets comprises fields.

15. A system as recited in claim 13 wherein the user device receives the content data stream and generates an error signal in response to the cyclic redundancy check value.

16. A system as recited in claim 15 wherein the user device calculates a calculated cyclic redundancy check value in response to each of the plurality of bytes of each of the plurality of the content file packets of the data stream and wherein the user device generates the error signal in response to comparing the cyclic redundancy check value and the calculated cyclic redundancy check value.

17. A system as recited in claim 15 wherein the user device communicates the error signal to the processing system though a communication network.

18. A system as recited in claim 15 wherein the user device disables playback of the content file in response to the error signal.

19. A system as recited in claim 15 further comprising a content processing system re-communicating the content data stream to the user device in response to the error signal.

20. A system as recited in claim 15 wherein a last set of bytes within a trailing data packet comprise the cyclic redundancy check value.

* * * * *